United States Patent [19]

Cavoretto et al.

[11] 3,893,036

[45] July 1, 1975

[54] PRECISION FUNCTION GENERATOR

[75] Inventors: James Louis Cavoretto; Alfred Alden Allworth; Carlo Infante, all of Portland, Oreg.

[73] Assignee: Tektronix, Inc., Beaverton, Oreg.

[22] Filed: July 27, 1973

[21] Appl. No.: 383,413

[52] U.S. Cl. ................ 328/185; 307/227; 307/228; 307/229; 328/186

[51] Int. Cl. ................ H03k 4/10

[58] Field of Search ................ 307/228, 229, 227; 328/181-185, 186

[56] References Cited

UNITED STATES PATENTS

| | | | |
|---|---|---|---|
| 2,829,280 | 4/1958 | Goodall | 307/227 |
| 3,072,856 | 1/1963 | Close | 328/181 |
| 3,303,359 | 2/1967 | Brisay, Jr. | 328/184 |
| 3,401,344 | 9/1968 | Andrus et al. | 328/181 |
| 3,440,448 | 4/1969 | Dudley | 328/185 |
| 3,579,124 | 5/1971 | O'Hara | 328/181 |
| 3,603,981 | 9/1971 | Rollenhagen et al. | 328/181 |
| 3,676,698 | 7/1972 | Hunter | 307/228 |
| 3,676,784 | 7/1972 | Comte | 307/228 |
| 3,718,825 | 2/1973 | Matsuoka | 328/181 |
| 3,745,367 | 7/1973 | Schindler et al. | 328/63 |
| 3,831,113 | 8/1974 | Ahmed | 307/228 |

*Primary Examiner*—Stanley D. Miller, Jr.
*Attorney, Agent, or Firm*—Adrian J. LaRue

[57] ABSTRACT

This invention relates to a high stability phased locked precision function generator providing linear or linear step voltage waveforms for stable scanning of systems such as dual gun scan converter systems compatable with computer interface means or normal television means whereby in a first mode, the target of such scan converter is scanned via the reading gun in conventional television fashion, and in a second mode the target of such scan converter is scanned vertically and horizontally in a quasi stepwise fashion.

5 Claims, 1 Drawing Figure

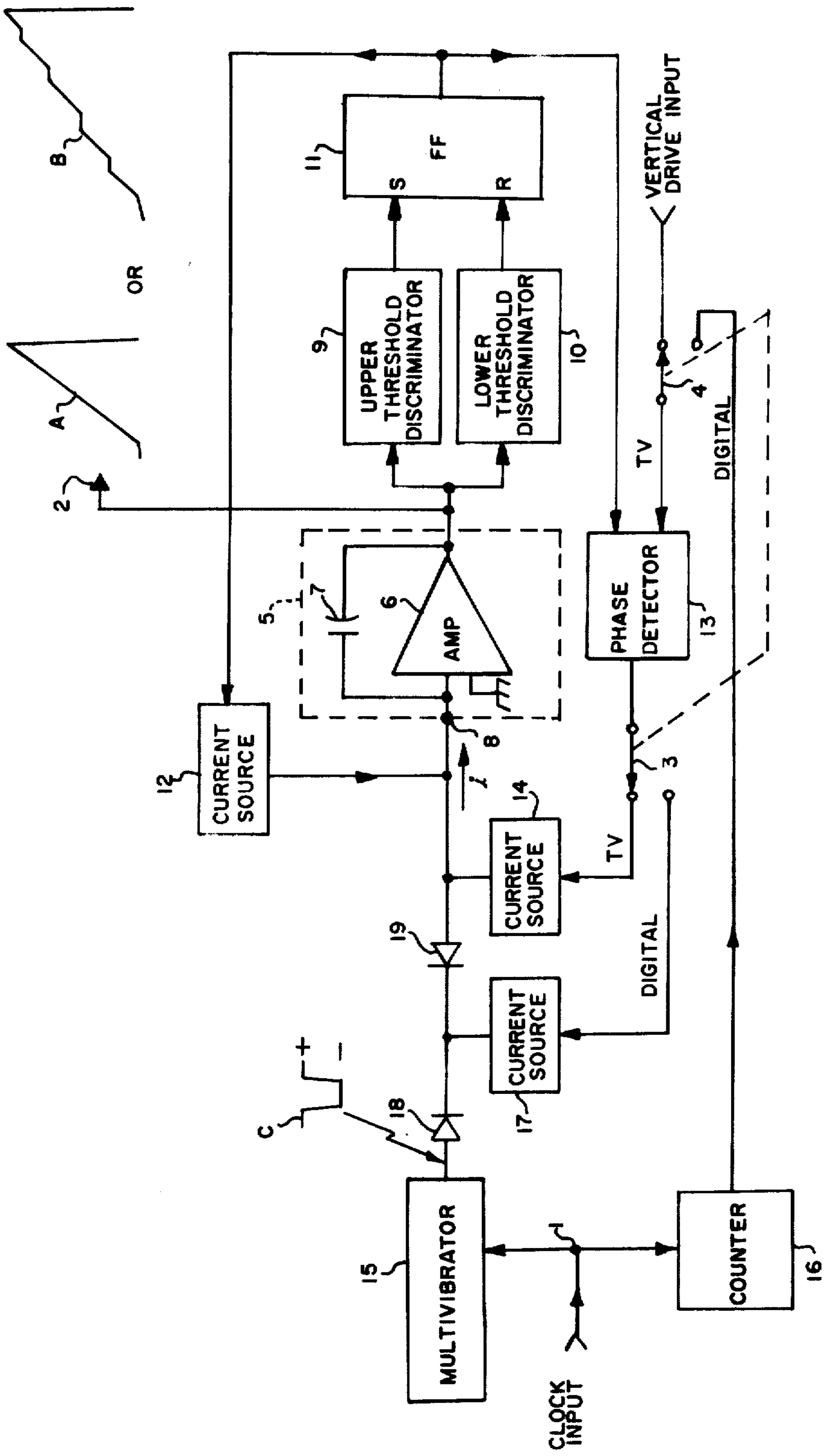
VERTICAL DRIVE INPUT
FF
S
R
UPPER THRESHOLD DISCRIMINATOR
LOWER THRESHOLD DISCRIMINATOR
OR
TV
DIGITAL
PHASE DETECTOR
AMP
CURRENT SOURCE
CURRENT SOURCE
CURRENT SOURCE
TV
DIGITAL
MULTIVIBRATOR
COUNTER
CLOCK INPUT

PRECISION FUNCTION GENERATOR

BACKGROUND OF THE INVENTION

Dual gun scan converters, such as one employing diode array targets, are well suited for acquiring fast single shot events. The waveform thus acquired can be either displayed on a normal television monitor for convenient viewing or digitized in such a manner as to be easily interfaceable to a computer. As the accuracy of the visual presentation on the television monitor or the analog-to-digital conversion can be no better than the overall stability of the function generator used, it is of prime importance that such generating systems be highly stable.

Function generator systems are already known in many embodiments. Conventional systems typically utilize a pulse integrator to form a staircase signal. A sequence of input pulses are fed into an integrator which integrates the successive pulses to produce the output signal. However, these systems are not desirable, as inconsistencies in the amplitude or width of input pulses cause undesirable variation in the output signal.

Systems such as described in U.S. Pat. No. 3,676,784 overcome the above identified problems associated with conventional systems. Such method produces an error voltage which is fed back to correct for such problems. Another method used to overcome the problems associated with conventional systems is disclosed in U.S. Pat. No. 3,579,124. In this method, the output signal is instantaneously increased or decreased to compensate for deviations in the input. Both methods as described in these U.S. Patents, nor do other known methods, provide a system which is drift free or temperature insenitive which is of prime importance in the method of the present invention.

SUMMARY OF INVENTION

The present invention overcomes the disadvantages of the prior art in that a high gain operational amplifier is used as the integrator with such output applied to discriminators. The discriminators being insensitive to temperature and quite stable are used to derive a signal which is phase locked so that the output signal is of proper duration and occurs synchronously with the driving signal.

It is therefore an object of the present invention to provide a new and improved scanning system which overcomes the disadvantages of the prior art.

It is another object of the present invention to provide a new and improved system for stable scanning that is both digital and television compatible.

It is yet another object of the present invention to provide a new and improved scanning system wherein the generation of digital ramps in a scan converter is an integral part of an analog to digital converter.

It is a still further object of the present invention to provide a new and improved scanning system whereby sufficient time is allowed for transmitting a digital data but allowing the total system to remain stable with time and temperature.

It is yet still another object of the present invention to provide a new and improved scanning system having the ability to change instantaneous frequency.

It is a yet still further object of the present invention to provide a new and improved scanning system having the ability to provide linear or stepped ramp signals with similar circuity.

It is an additional object of the present invention to provide a new and improved stairstep generator whereby an exact number of steps are generated.

Further features, advantages, and objects of the present invention will become more readily apparent from the following detailed description in terms of the embodiment thereof which is shown in the accompanying drawing. It is to be understood, however, that the drawing is for the purpose of illustration only and is not a defination of the limits of the invention, reference being had to the appended claims for this purpose.

The drawing shows in block form an electronic circuit diagram of the high stability electronic scanning system according to the present invention.

DETAILED DESCRIPTION OF INVENTION

Referring to the drawing, waveform A or B is generated at output terminal 2 dependent upon the position of switches 3 and 4. With the switches 3 and 4 in the position shown, the waveform A will be generated and is the waveform desired, say, for scanning via the reading gun of a dual gun scan converter in a conventional television fashion. Signal generating means 5 consists of a high gain differential amplifier 6 and a capacitor 7 connected as an integrator so as to convert a constant current $i$ at its input terminal 8 into a voltage ramp of slope $i/c$ as is well known. Such voltage ramp is the waveform A and is applied to an upper threshold discriminator 9 and a lower threshold discriminator 10. Threshold discriminators 9 and 10 can be made to be quite stable and temperature insensitive by using modern integrated circuits and metal film resistors. Such discriminators are well known and detect a predetermined upper and lower level of the signal applied.

The output of upper threshold discriminator 9 and lower threshold discriminator 10 are applied to a set-reset flip-flop 11 which, in turn, controls a current source 12 following conventional practice as disclosed in U.S. Pat. No. 3,122,652 assigned to the assignee of the present invention. The output of set-reset flip-flop 11 is also applied to a phase detector 13 along with a vertical drive signal via the switch 4 from an external television type sync generator of conventional design.

Phase detector 13 produces an output which is applied via the switch 3 to a current source 14 wherein is developed the current $i$. The phase lock loop stage will adjust the value of $i$ so that the waveform A is of proper duration and occurs synchronously with the vertical drive pulse provided by the external sync generator. Using the above described mode, the height of the voltage ramp (waveform A) is determined by the threshold voltages of the upper and lower threshold discriminators while the slope and duration of such voltage ramp is held constant by the servo action of the phase detector.

In the digital mode, the switches 3 and 4 are in the opposite position, thus current source 14 is non-operating. A series of clock pulses are received at the input 1 to simultaneously drive a monostable multivibrator 15 and a counter 16. Such drive to multivibrator 15 controls the generation of the waveform C by alternately routing current from current source 17 via the diode 18 or into the integrator 5 via the diode 19. As can be discerned, an incremental ramp and step waveform B is developed at a rate determined by the action of multivibrator hence the clock input pulses. Therefore, each clock pulse causes a ramp and step waveform to be obtained.

Clearly any inaccuracy or drift in either the integrator, the width of the multivibrator waveform C, the current source 17, or the clock pulse frequency would affect the size or slope of each incremental ramp of the waveform B which would cause the ramp to end sooner or later than normal. Thus, the step portion of the waveform B would be smaller or larger. This possibility is eliminated by the phase detector stage 13 which is now being driven simultaneously by a digital signal corresponding to the upper and lower limits of the waveform B and the output of the counter via the switch 4. This process insures time coincidence between the end of the ramp and the digitally determined pulse. Thus, the system becomes accurate and stable with respect to temperature.

To further understand operation, assume the generator is employed within a scan converter system and is being operated in a digital mode. The scan process, in steps, and the target of the scan converter can be subdivided into a matrix, say 512 × 512. For such purposes, a ÷ 512 counter and a related clock pulse would be used. By counting the number of steps, both vertical and horizontal to a desired data point, the X and Y coordinates in digital form can be found.

The flat portion of the waveform following each ramp portion of the waveform B insures enough time to allow subsequent circuitry to determine whether a data point was present or not. It should be noted that if the slope and size of each incremental ramp is chosen correctly, the same scanning velocity in either the digital or television mode may be used.

As can be discerned from the above description, only the vertical scan circuitry of the system has been shown and described. The horizontal scan circuitry is similar and will therefore not be discussed.

While there has been shown and described the preferred embodiment of the present invention, it will be apparent to those skilled in the art that many changes and modifications may be made without departing therefrom in its broader aspects. For example, as in the preceding operation just described, the clock pulse and the ÷ 512 counter are synchronous; by interrupting the clock pulse in the digital mode, the instantaneous frequency of the ramps can be changed, i.e., when the clock pulse is removed, the ramp holds for the duration of the off time and the ÷ 512 counter pulse is delayed until the clock pulse is reapplied. Then, the ramp continues toward the upper threshold while the ÷ 512 counter resumes counting towards 512, both delayed by the same amount of time so that the clock pulse and the error pulse will arrive at the phase detector inputs as if no interruption had occurred; thus, the loop remains phase locked and stable. Therefore, the appended claims are intended to cover all such modifications, operations, and changes as fall within the true spirit and scope of the invention.

We claim:

1. A precision function generator for generating linear or linear stepped ramp waveform signals in response to selected input synchronizing signals, comprising:
- signal input receiving means for receiving the synchronizing signals;

- integrator means having an output whose slope is proportional to an input current applied thereto;
- digital control means responsive to said output for providing a digital control signal, and
- current source means including phase detector means responsive to said digital control signal and said selectable signal for providing a phase error signal, a plurality of selectively adjusted current means whose outputs are adjustable in response to said phase error signal to provide said input current, means for selecting said selectively adjustable current means, and gate means responsive to a switching pulse for selecting said selectively adjustable current means, said current source means responsive to said digital control signal and the synchronizing signals for providing said input current.

2. The generator according to claim 1, said signal input receiving means further comprising:
- a first input;
- a second input;
- a counter means responsive to the synchronizing signal applied to said first input for providing a scan control signal;
- a multivibrator means responsive to the synchronizing signal applied to said first input for providing a switching pulse; and
- a switch means having a first state and a second state, said first state to receive said scan control signal and said second state to receive the synchronizing signal applied to said second input for providing a selectable signal.

3. The generator according to claim 1, said digital control means further comprising:
- discriminator means for detecting when the output of said integrator reaches a pair of predetermined output levels; and digital means responsive to the detected pair of predetermined output levels for providing said digital control signal.

4. A precision function generator for generating a linear ramp voltage waveform signal in response to a synchronizing signal, comprising:
- signal input receiving means for receiving the synchronizing signal;
- integrator means having an output whose slope is proportional to an input current applied thereto;
- digital control means defining a pair of discriminator means for detecting a pair of predetermined output levels and a logic means defining a flip-flop responsive to the detected output levels for providing a digital control signal;
- phase detector means responsive to said digital control signal and the synchronizing signal for providing a phase error signal; and
- current source means responsive to said phase error signal and said digital control signal for providing said input current.

5. A precision function generator for generating a linear stepped ramp voltage wave form signal in response to an input synchronizing signal, comprising:
- signal input receiving means for receiving the synchronizing signal;
- integrator means having an output whose slope is proportional to an input current applied thereto;
- digital control means defining a pair of discriminator means for detecting a pair of predetermined output levels and a logic means defining a flip-flop responsive to the detected output levels for providing a digital control signal;

counter means responsive to the synchronizing signal applied to said signal input receiving means for providing a scan control signal;

multivibrator means responsive to the synchronizing signal applied to said signal input receiving means for providing a switching pulse;

phase detector means responsive to said digital control signal and said scan control signal for providing a phase error signal;

current source means responsive to said phase error signal and said digital control signal for providing said input current; and gate means responsive to said switching pulse for gating said input current during selected portions of the linear stepped ramp voltage waveform signal.

* * * * *